United States Patent
Arndt et al.

(10) Patent No.: US 10,043,139 B2
(45) Date of Patent: *Aug. 7, 2018

(54) METHOD AND APPARATUS FOR RESOLVING CONTENTION IN A COMPUTER SYSTEM

(71) Applicant: INTERNATIONAL BUSINESS MACHINES CORPORATION, Armonk, NY (US)

(72) Inventors: Karla K. Arndt, Rochester, MN (US); Joseph W. Gentile, New Paltz, NY (US); Nicholas R. Jones, Poughkeepsie, NY (US); Nicholas C. Matsakis, Poughkeepsie, NY (US); David H. Surman, Marlboro, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/796,881

(22) Filed: Oct. 30, 2017

(65) Prior Publication Data

US 2018/0039915 A1    Feb. 8, 2018

Related U.S. Application Data

(63) Continuation of application No. 14/995,266, filed on Jan. 14, 2016.

(51) Int. Cl.
*G06F 9/50* (2006.01)
*G06N 99/00* (2010.01)
(Continued)

(52) U.S. Cl.
CPC ......... *G06N 99/005* (2013.01); *G06F 9/5011* (2013.01); *G06F 9/542* (2013.01); *G06F 17/30312* (2013.01)

(58) Field of Classification Search
CPC ..................................................... G06F 9/542
See application file for complete search history.

(56) References Cited

U.S. PATENT DOCUMENTS

2006/0168166 A1    7/2006  Hardwick
2009/0288074 A1    11/2009 Carroll et al.
(Continued)

OTHER PUBLICATIONS

IBM "Appendix P", List of IBM Patents or Patent Applications Treated as Related dated Mar. 2, 2018; 2 pgs.

*Primary Examiner* — Charlie Sun
(74) *Attorney, Agent, or Firm* — Cantor Colburn LLP

(57) ABSTRACT

Aspects relate to a computer implemented method for resolving abnormal contention on a computer system. The method includes detecting, using a processor, abnormal contention of a serially reusable resource caused by a first process, wherein the abnormal contention includes the first process blocking the serially reusable resource from a second process that is waiting to use the serially reusable resource. The method includes collecting, in a computer storage medium, resource data in a serialized resource history database and analyzing the resource data associated with the serially reusable resource and adjusting, using the processor, resource allocation for the first process of the serially reusable resource based on the resource data. The method also includes processing, using the processor and the serially reusable resource, the first process based on the resource allocation and releasing, using the processor, the serially reusable resource by the first process in response to the first process completing.

1 Claim, 7 Drawing Sheets

(51) Int. Cl.
*G06F 9/54* (2006.01)
*G06F 17/30* (2006.01)

(56) References Cited

U.S. PATENT DOCUMENTS

| | | |
|---|---|---|
| 2013/0152090 A1 | 6/2013 | Balko |
| 2017/0206103 A1 | 7/2017 | Arndt et al. |
| 2017/0206462 A1 | 7/2017 | Arndt et al. |
| 2017/0206463 A1 | 7/2017 | Arndt et al. |
| 2018/0039915 A1 | 2/2018 | Arndt et al. |

METHOD AND APPARATUS FOR RESOLVING CONTENTION IN A COMPUTER SYSTEM

PRIORITY

This application is a continuation of and claims priority to U.S. patent application Ser. No. 14/995,266, filed on Jan. 14, 2016, entitled "METHOD AND APPARATUS FOR RESOLVING CONTENTION IN A COMPUTER SYSTEM" and published as US2017-0206463A1 on Jul. 20, 2017 the entire contents of which are incorporated herein by reference.

BACKGROUND

The present disclosure relates generally to resolving abnormal contention and, more specifically, to a method and apparatus for resolving abnormal contention in a computer system for a serially reusable resource.

In computer system workloads there are often a number of transactions that make up processes or jobs, and a number of processes that make up a program, which are all vying for some of the same limited resources, some of which are serially reusable resources such as memory, processors, and software instances. In such computer system workloads, there may be many relationships between processes, transactions, and programs that are increasingly dynamic creating complex resource dependency scenarios that can cause delay. For example, when a thread or unit of work involved in a workload blocks a serially reusable resource, it slows itself down and other processes and/or transactions going on concurrently across the system, the entire system complex, or cluster of systems, which are waiting for the resource. Some of this slowdown and waiting is known as contention and is to be expected. However, abnormal contention, such as contention that will never end due to a deadlock, caused by a program defect, or is longer than normal, is of concern. In mission critical workloads, such contention and delays may not be acceptable to the system and a user.

Additional delays may be caused by human factors. For example, one such factor that can lead to delays in a reduction of IT staff in an IT shop or department as well as the inexperience of the IT staff below a threshold for providing sufficient support thereby causing delays. Some automation may be utilized to help alleviate delay, however, automation may not have enough intrinsic knowledge of the system to detect or make decisions regarding delays or the causes of the blocking processes. Further, knowing the correct action to choose when an abnormal contention event is detected is a difficult choice to make for both automation and human operators. Additionally, it can take thirty minutes or longer for an operator to respond to a console message, and once at the console, the operator would have to have an intrinsic knowledge of the related processes and resources to decide which action to take. Operator automation programs would fare worse, often simply picking a response without input from the system.

There are other approaches today that help in the attempt to detect and/or resolve serialization issues within a system or across a distributed environment such as deadlock detectors that either avoid or detect deadlocks and possibly take action such as terminating or rolling back a requestor to end the deadlock.

An operating system of the future is envisioned that can monitor such workloads and automatically resolve abnormal contention (with greater accuracy) to help recover from delays in order to provide increased availability and throughput of resources for users. These types of analytics and cluster-wide features may help keep valuable systems operating competitively at or above desired operating thresholds.

SUMMARY

In accordance with an embodiment, a method for resolving abnormal contention is provided. The method includes detecting, using a processor, abnormal contention of a serially reusable resource caused by a first process, wherein the abnormal contention includes the first process blocking the serially reusable resource from a second process that is waiting to use the serially reusable resource and collecting, in a computer storage medium, resource data in a serialized resource history database and analyzing the resource data associated with the serially reusable resource. The method also includes adjusting, using the processor, resource allocation for the first process of the serially reusable resource based on the resource data and processing, using the processor and the serially reusable resource, the first process based on the resource allocation. Further, the method includes releasing, using the processor, the serially reusable resource by the first process in response to the first process completing.

In accordance with another embodiment, a computer system for resolving abnormal contention includes a memory having computer readable instructions and one or more processors for executing the computer readable instructions. The computer readable instructions includes detecting, using the one or more processors, abnormal contention of a serially reusable resource caused by a first process, wherein the abnormal contention includes the first process blocking the serially reusable resource from a second process that is waiting to use the serially reusable resource and collecting, in the memory, resource data in a serialized resource history database and analyzing the resource data associated with the serially reusable resource. The system also includes adjusting, using the one or more processors, resource allocation for the first process of the serially reusable resource based on the resource data and processing, using the one or more processors and the serially reusable resource, the first process based on the resource allocation, and releasing, using the one or more processors, the serially reusable resource by the first process in response to the first process completing.

In accordance with a further embodiment, a computer program product for resolving abnormal contention includes a non-transitory storage medium readable by a processing circuit and storing instructions for execution by the processing circuit for performing a method. The program instructions executable by a processor to cause the processor to detect abnormal contention of a serially reusable resource caused by a first process, wherein the abnormal contention includes the first process blocking the serially reusable resource from a second process that is waiting to use the serially reusable resource and collect resource data in a serialized resource history database and analyzing the resource data associated with the serially reusable resource. The program instructions also adjust resource allocation for the first process of the serially reusable resource based on the resource data, process using the serially reusable resource the first process based on the resource allocation, and release the serially reusable resource by the first process in response to the first process completing.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The forgoing and other features, and advantages are apparent from the following detailed description taken in conjunction with the accompanying drawings in which.

DETAILED DESCRIPTION

It is understood in advance that although this disclosure includes a detailed description on a single computer system, implementation of the teachings recited herein are not limited to a computer system and environment. Rather, embodiments of the present invention are capable of being implemented in conjunction with any other type of computing environment now known or later developed such as systems that include multiple computers or clusters of systems.

Embodiments described herein are directed to resolving abnormal contention. For example, in this disclosure one or more methods and apparatus for a system to resolve abnormal contention delays resulting from access to serially reusable resources is introduced. A serially reusable resource is any part of a system that can be used by more than one process, program, job, and/or thread but for which access must be controlled such that either the serially reusable resource can be used one at a time only (exclusive access which is usually akin to making updates or if there is only one) or the resource can be shared simultaneously, but only if the process, program, job, and/or threads are only reading. One or more embodiments as disclosed herein can be applied to abnormal contention, both the type that may resolve in time (not a deadlock), and deadlocked contention.

One or more of the disclosed embodiments help in resolving abnormal delays that occur during obtaining and releasing serialization. One or more of the disclosed embodiments focus on situations where a currently processing guest program image, also called a process or job, which is currently holding ownership of a serially reusable resource, blocks a shared serialization resource in a constrained environment. Particularly, one or more embodiments provide a method for the system to intelligently pick an action that limits the negative impact on a process, in real time, for these abnormal contention events. For example, one or more embodiments provide a method and system for determining an action to take that has the least negative impact for other types of contention scenarios while resolving the abnormal contention by applying analytics to create future models of potential actions to determine the correct action to take that will resolve the issue with the least impact.

Figure 1:
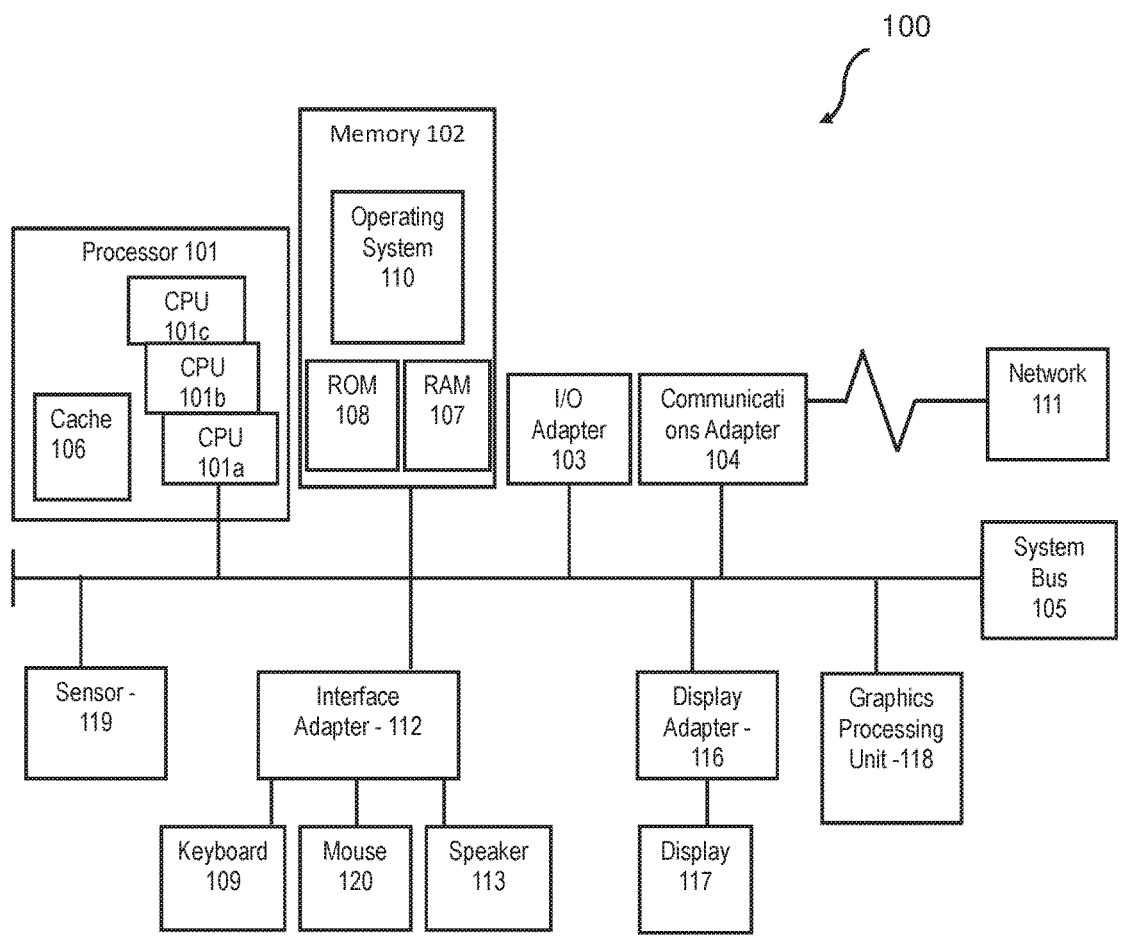
FIG. 1 depicts a block diagram of a computer system in accordance with some embodiments of this disclosure.

Turning now to FIG. 1, an electronic computing device 100, which may also be called a computer system 100 that includes a plurality of electronic computing device sub-components, any one of which may include or itself be a serially reusable resource, is generally shown in accordance with one or more embodiments. FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc. According to another embodiment, the computer system 100 may be an embedded computer system. For example, the embedded computer system 100 may be an embedded system in a washing machine, an oil drilling rig, or any other device that can contain electronics.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Communications adaptor 104 may be operatively connect computer 100 to one or more networks 111. System bus 105 may also connect one or more user interfaces via interface adaptor 112. Interface adaptor 112 may connect a plurality of user interfaces to computer 100 including, for example, keyboard 109, mouse 120, speaker 113, etc. System bus 105 may also connect display adaptor 116 and display 117 to processor 101. Processor 101 may also be operatively connected to graphical processing unit 118.

Further, the computer 100 may also include a sensor 119 that is operatively connected to one or more of the other electronic sub-components of the computer 100 through the system bus 105. The sensor 119 can be an integrated or a standalone sensor that is separate from the computer 100 and may be communicatively connected using a wire or may communicate with the computer 100 using wireless transmissions.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 110. Operating system 110 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 120. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 111.

Network 111 can be an IP-based network for communication between computer 100 and any external device. Network 111 transmits and receives data between computer 100 and external systems. In an exemplary embodiment, network 111 can be a managed IP network administered by a service provider. Network 111 may be implemented in a wireless fashion, e.g., using wireless protocols and technologies, such as WiFi, WiMax, etc. Network 111 can also be a packet-switched network such as a local area network, wide area network, metropolitan area network, Internet network, or other similar type of network environment. The network 111 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 110, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

According to one or more embodiments, any one of the electronic computing device sub-components of the computer 100 includes, or may itself be, a serially reusable resource that receives a number of process requests. According to one or more embodiments, a process is abstract and can include a program, a thread, other processes or jobs, a subsystem, etc., or a combination thereof. Further, according to one or more embodiments, a process can include one or more threads within a program or different programs. Accordingly, one or more contention events may occur at any such serially reusable resource element caused by a plurality of program images vying for resources while one of those virtual program images, which may also be referred to as a process, blocks the serially reusable resource. Further, the contention events may be normal or abnormal which may be detected and resolved using a method or apparatus in accordance with one or more of the disclosed embodiments herewith.

Figure 2A:
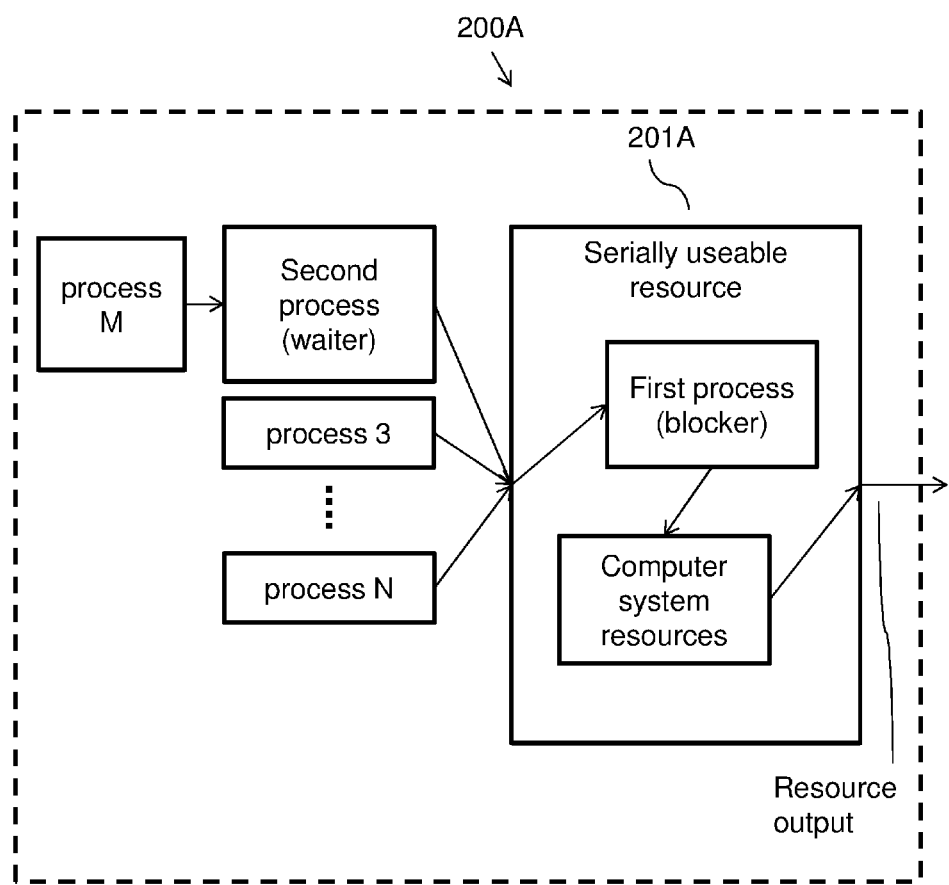
FIG. 2A depicts a block diagram of a computer system for implementing some or all aspects of the computer system for resolving abnormal contention, according to some embodiments of this disclosure.

FIG. 2A depicts a block diagram of a system for implementing some or all aspects of a computer system 200A for resolving abnormal contention, according to some embodiments of this disclosure. The computer system 200A can be a single computer, or any one or more sub-elements as shown in FIG. 1. In other embodiments, the computer system can be a cluster of computers or can take on another physical structure with additional software or firmware layers.

Turning now to the other elements shown in FIG. 2A, the serially reusable resource 201A is shown having a serial path through which processes/operations are received, queued, processed, and outputs are transmitted. For example, a first process (blocker) is shown holding and using the serially reusable resource 201A. As shown, the first process (blocker) is communicatively connected to computer system resources which process the operations of the first process (blocker). As shown, the computer system resources are part of the serially reusable resource that the first process is holding and using to the exclusion of other processes. Once processed the first process (blocker) will be released along the resource output path shown.

A second process (waiter) can send a request and queue up for processing and use of the serially reusable resource 201A. As shown the second process (waiter) can remain within the computer system 200A but is in a queue waiting to access and use the serially reusable resource that is currently being held by the first process (blocker) which has temporary ownership. Further other processes can queue up and wait to access the serially reusable resource 201A. For example process 3 through process N can queue up in parallel with the second process (waiter). In one embodiment the process with the highest priority will gain access to the serially reusable resource 201A once it is released by the first process (blocker). In another embodiment the process that will be granted access to the serially reusable resource can be selected based on a first come first serve basis, or alternatively, based on another selecting scheme such as based on process/operation count and processing size. According to another embodiment, a process M can also queue up for using the serially reusable resource 201A in series behind, for example, the second process (waiter). According to one or more embodiments, the serially reusable resource 201 can be serialized via any serialization method which may be operating system dependent as well as programming language dependent (e.g., mutex, semaphore, enqueuer, latch, lock, etc.).

In these embodiments, the processes are serially processed by the serially reusable resource 201A. Thus, the currently processing first process (blocker) can cause a delay for the other processes that are queued up after the currently processing first process (blocker). Such a delay is called a contention event which can be a normal contention event if the amount of the delay consumes the expect amount of time and/or processing resources. However, the contention event may be an abnormal contention event if the first process (blocker) usage of the serially reusable resource 201A exceeds certain thresholds. This abnormal contention can be detected and resolved by implementing a system and method according to the disclosed one or more embodiments of the disclosure.

Figure 2B:
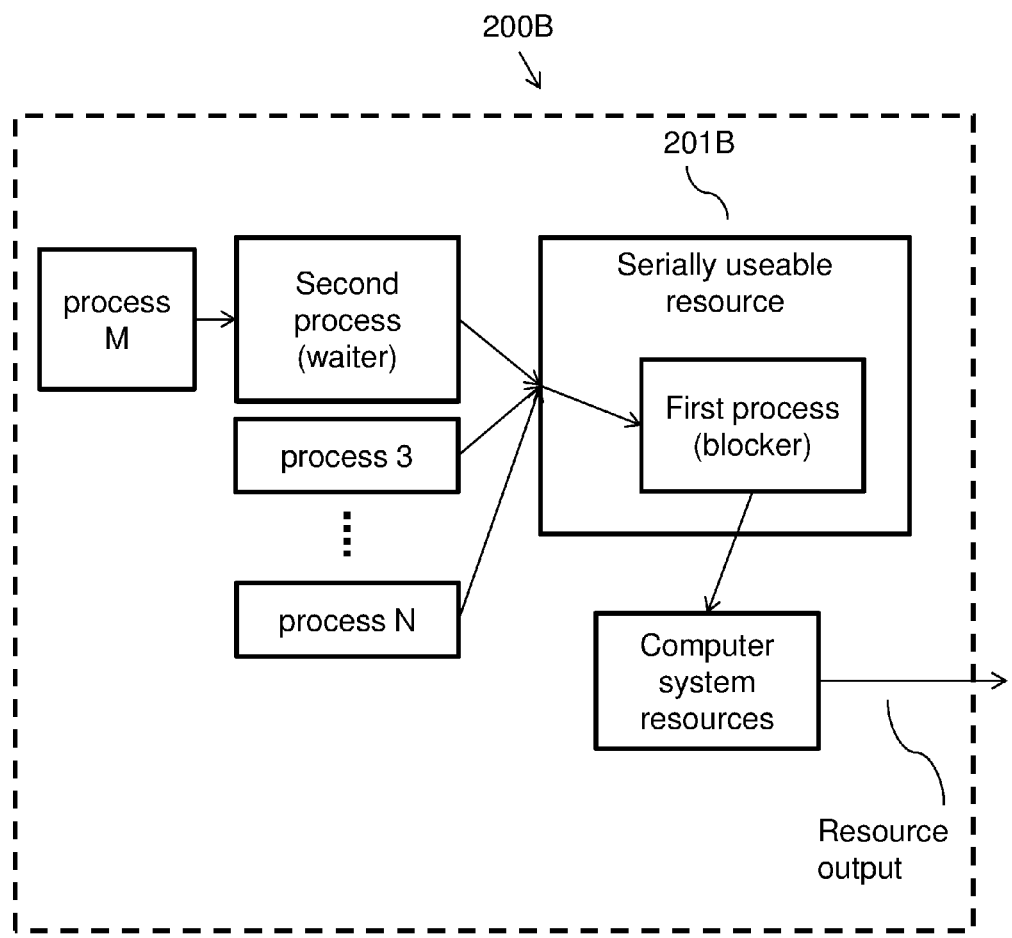
FIG. 2B depicts a block diagram of a computer system for implementing some or all aspects of the computer system for resolving abnormal contention, according to some embodiments of this disclosure.

Turning now to FIG. 2B, a block diagram of a system for implementing some or all aspects of a computer system 200B for resolving abnormal contention, according to some embodiments of this disclosure. The computer system 200B can be a single computer, or any one or more sub-elements as shown in FIG. 1. In other embodiments, the computer system can be a cluster of computers or can take on another physical structure.

Turning now to the other elements shown in FIG. 2B, the serially reusable resource 201B is shown having a serial path through which processes and their processes/operations are received, queued, processed, and outputs are transmitted. For example, a first process (blocker) is shown holding and using the serially reusable resource 201B. As shown, the first process (blocker) is communicatively connected to computer system resources which process the operations of the first process (blocker). As shown, the computer system resources are separate from the serially reusable resource that the first process is holding and using to the exclusion of other processes. Once processed the first process (blocker) will be released along the resource output path shown.

A second process (waiter) can send request and queue up for processing and use of the serially reusable resource 201B. As shown the second process (waiter) can remain within the computer system 200B but is in a queue waiting to access and use the serially reusable resource that is currently being held by the first process (blocker) which has temporary ownership. Further other processes can queue up and wait to access the serially reusable resource 201B. For example process 3 through process N can queue up in parallel with the second process (waiter). In one embodiment the process with the highest priority will gain access to the serially reusable resource 201B once it is released by the first process (blocker). In another embodiment the process that will be granted access to the serially reusable resource can be selected based on a first come first serve basis, or alternatively, based on another selecting scheme such as based on process/operation count and processing size. According to another embodiment, a process M can also queue up for using the serially reusable resource 201B in series behind, for example, the second process (waiter).

In these embodiments, the processes are serially processed by the serially reusable resource 201B. Thus, the currently processing first process (blocker) can cause a delay for the other processes that are queued up after the currently processing first process (blocker). Such a delay is called a contention event which can be a normal contention event if the amount of the delay consumes the expect amount of time and/or processing resources. However, the contention event may be an abnormal contention event if the first process (blocker) usage of the serially reusable resource 201B exceeds certain thresholds. This abnormal contention can be detected and resolved by implementing a system and method according to the disclosed one or more embodiments of the disclosure.

Figure 3:
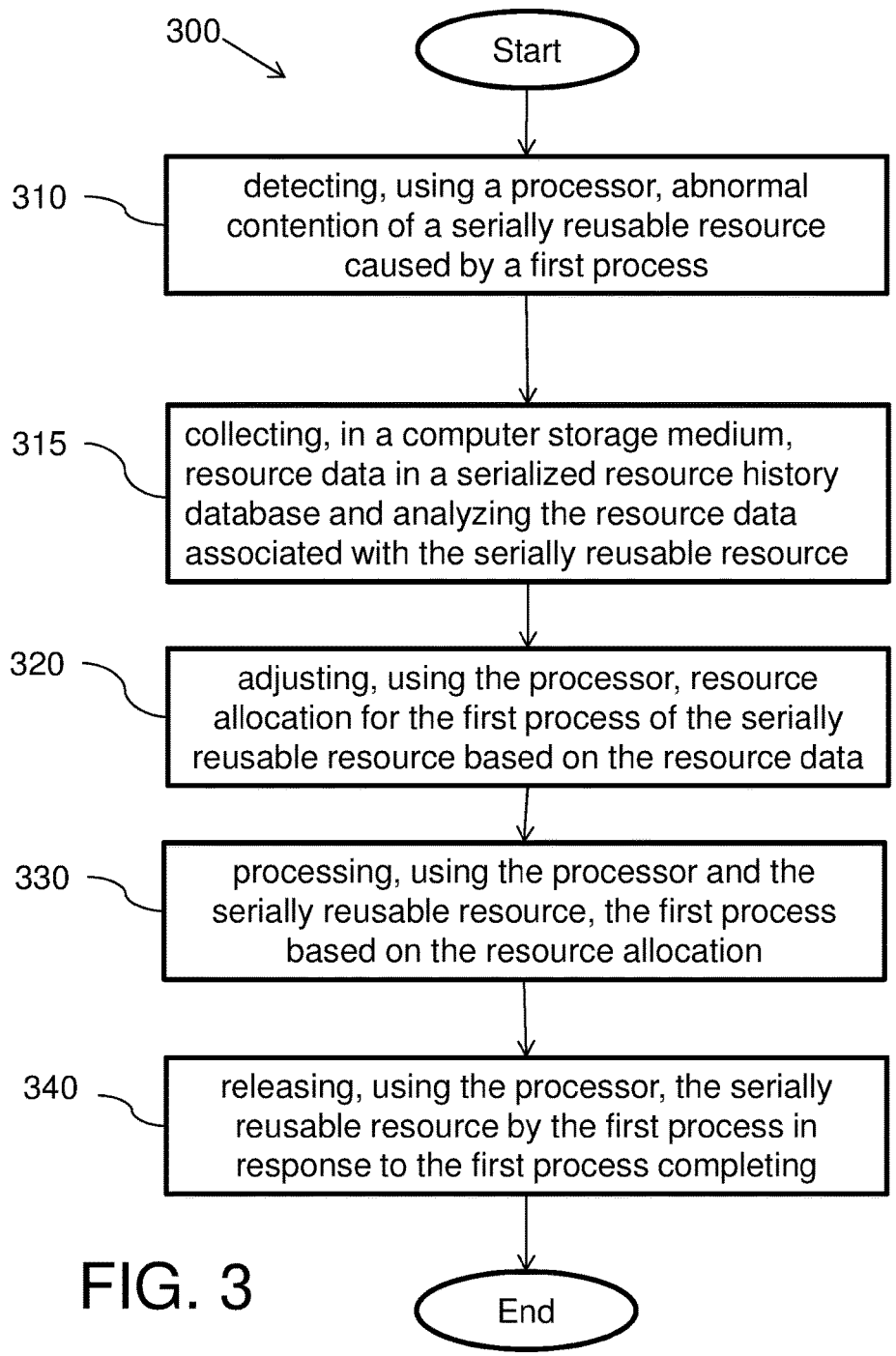
FIG. 3 depicts a process flow of a method for resolving abnormal contention in accordance with some embodiments of this disclosure.

FIG. 3 depicts a process flow of a method 300 for resolving abnormal contention in accordance with some embodiments of this disclosure. The method 300 includes detecting, using a processor, abnormal contention of a serially reusable resource caused by a first process, wherein the abnormal contention includes the first process blocking the serially reusable resource from a second process that is waiting to use the serially reusable resource (operation 310). The method also includes collecting, in a computer storage medium, resource data in a serialized resource history database and analyzing the resource data associated with the serially reusable resource (operation 315). The method also includes adjusting, using the processor, resource allocation for the first process of the serially reusable resource based on the resource data (operation 320). The method further includes processing, using the processor and the serially reusable resource, the first process based on the resource allocation (operation 330). Finally, the method includes releasing, using the processor, the serially reusable resource by the first process in response to the first process completing (operation 340).

Figure 4:
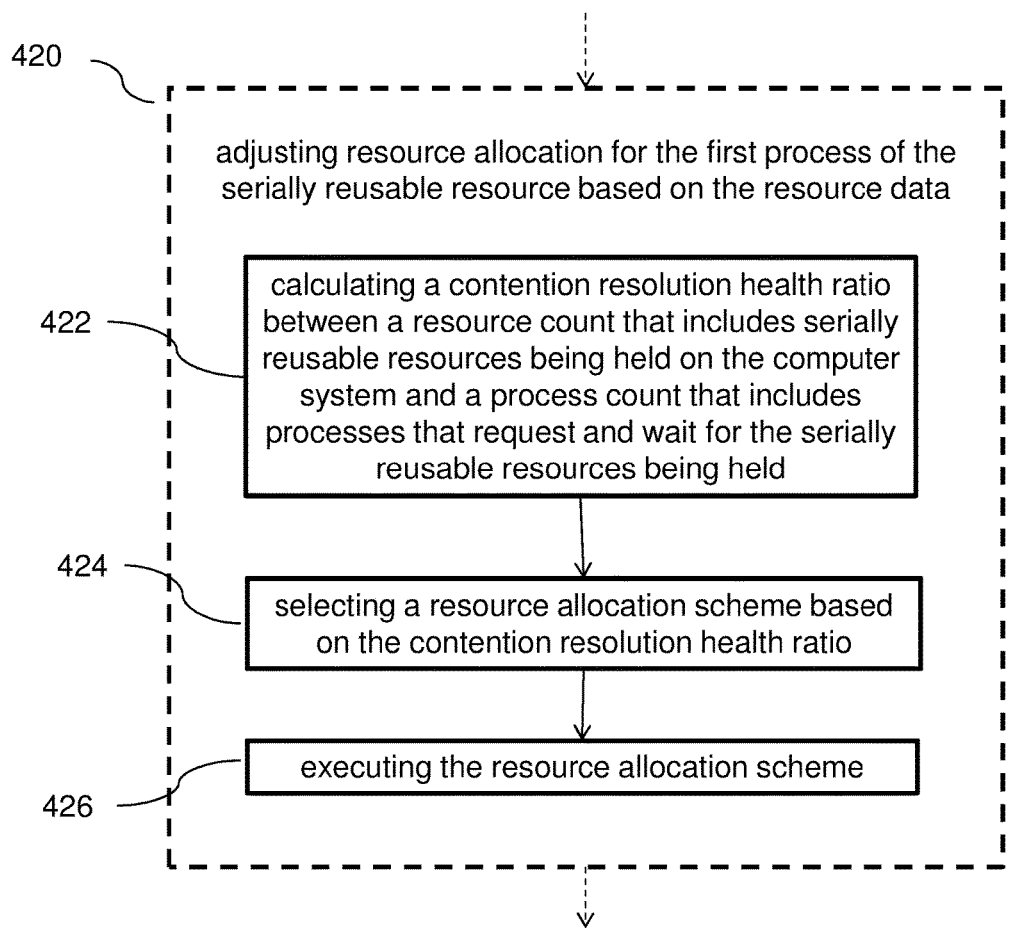
FIG. 4 depicts a process flow of adjusting resource allocation for a method for resolving abnormal contention in accordance with some embodiments of this disclosure.

FIG. 4 depicts a process flow of adjusting resource allocation 420 for a method for resolving abnormal contention in accordance with some embodiments of this disclosure. For example, adjusting resource allocation 420 can include calculating a contention resolution health ratio between a resource count that includes serially reusable resources being held on the computer system and a process count that includes processes that request and wait for the serially reusable resources being held (operation 422). Adjusting resource allocation 420 can further include selecting a resource allocation scheme based on the contention resolution health ratio (operation 424). Adjusting resource allocation 420 can also include executing the resource allocation scheme (operation 426).

According to one or more embodiments, adjusting resource allocation for the first process of the serially reusable resource based on the resource data further includes selecting the resource allocation scheme that has a least negative impact on the first process. A least negative impact can be defined by an impact that has the least amount of impact on the ability, speed, and quality with which the first process, and other processes on the system, waiting and non-waiting, can complete. Further, according to one or more embodiments, the resource data can include one or more from a group consisting of serialized resource event information, contention event information, serialized resource status counts, and abnormal contention event information. According to another embodiment the method may be executed in real-time.

According to an embodiment, the resource allocation scheme includes terminating and removing the first process immediately allowing the second process to begin processing and adding the first process back to a queue of waiting processes. According to another embodiment, the resource allocation scheme includes waiting for a period of time, and terminating and removing the first process after the period of time has passed, allowing the second process to begin processing and adding the first process back to a queue of waiting processes. According to another embodiment, the resource allocation scheme includes accelerating the first process blocking the serially reusable resource.

According to one or more embodiments, accelerating the first process blocking the serially reusable resource includes adjusting resource priority values of the first process and the second process. According to another embodiment, accelerating the first process blocking the serially reusable resource includes readjusting resource priority values of the first process and the second process. According to another embodiment, accelerating the first process blocking the serially reusable resource includes adjusting priorities of all processes in the computer system waiting to use the serially reusable resource. According to another embodiment, accelerating the first process blocking the serially reusable resource includes granting access to additional computer system resources for processing the first process.

Figure 5:
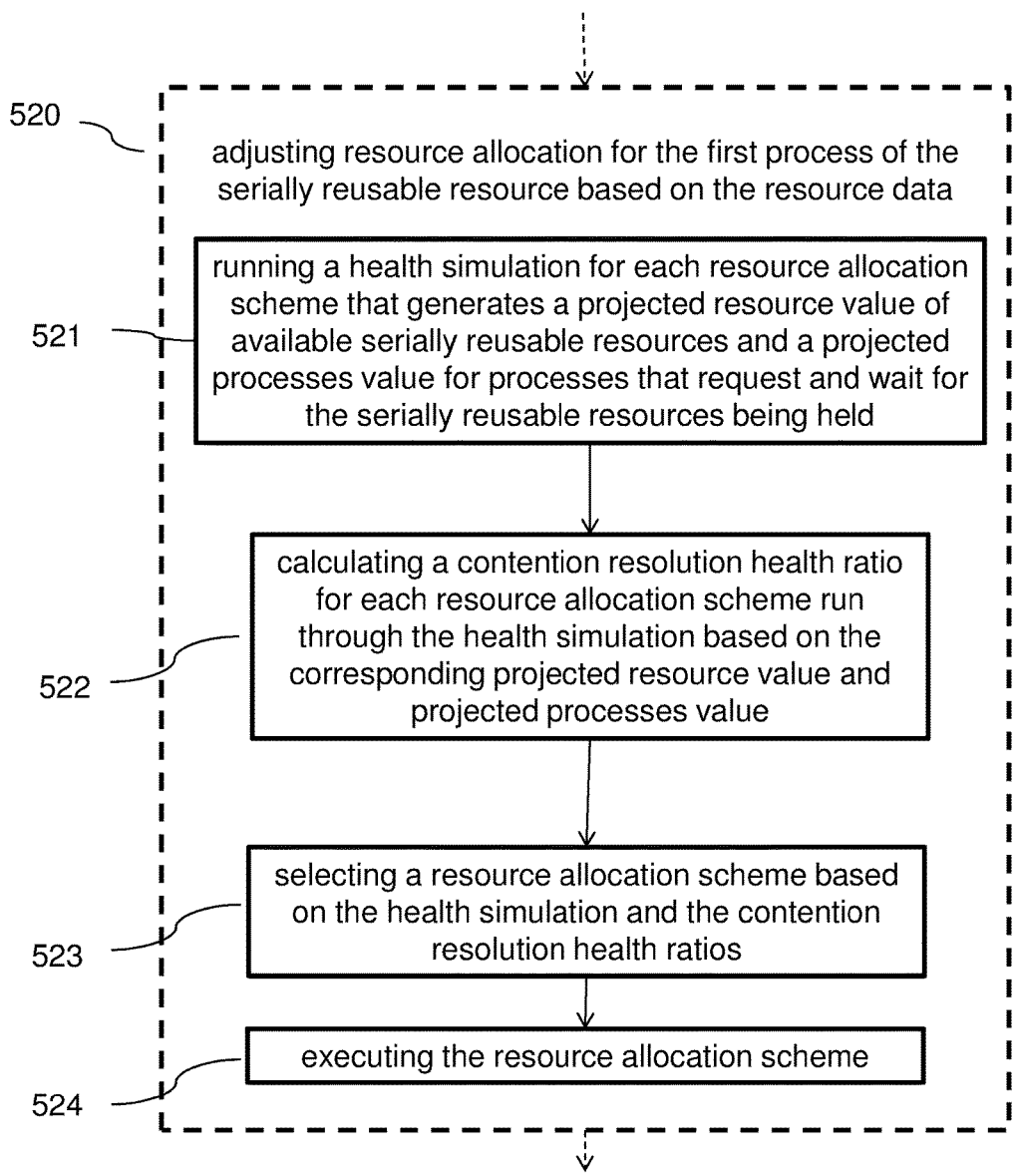
FIG. 5 depicts a process flow of adjusting resource allocation for a method for resolving abnormal contention in accordance with some other embodiments of this disclosure.

FIG. 5 depicts a process flow of adjusting resource allocation 520 for a method for resolving abnormal contention in accordance with some other embodiments of this disclosure. Adjusting resource allocation 520 can include running a health simulation for each resource allocation scheme that generates a projected resource value of available serially reusable resources and a projected processes value for processes that request and wait for the serially reusable resources being held (operation 521). Adjusting resource allocation 520 can also include calculating a contention resolution health ratio for each resource allocation scheme run through the health simulation based on the corresponding projected resource value and projected processes value (operation 522). Further, adjusting resource allocation 520 can include selecting a resource allocation scheme based on the health simulation and the contention resolution health ratios (operation 523) and executing the resource allocation scheme (operation 524). According to another embodiment, selecting the resource allocation based on the health simulation and the contention resolution health ratios includes selecting, in response to the contention resolution health ratios being tied, the resource allocation scheme based on the resource allocation scheme that is least destructive to the first process.

Further, according to other embodiments, scenarios can be run for processes holding resources that the first process is waiting for, and further down the resource chain. Therefore, actions can be selected that are the most helpful and least destructive to the set of processes as a whole, and not just to the first process.

Figure 6:
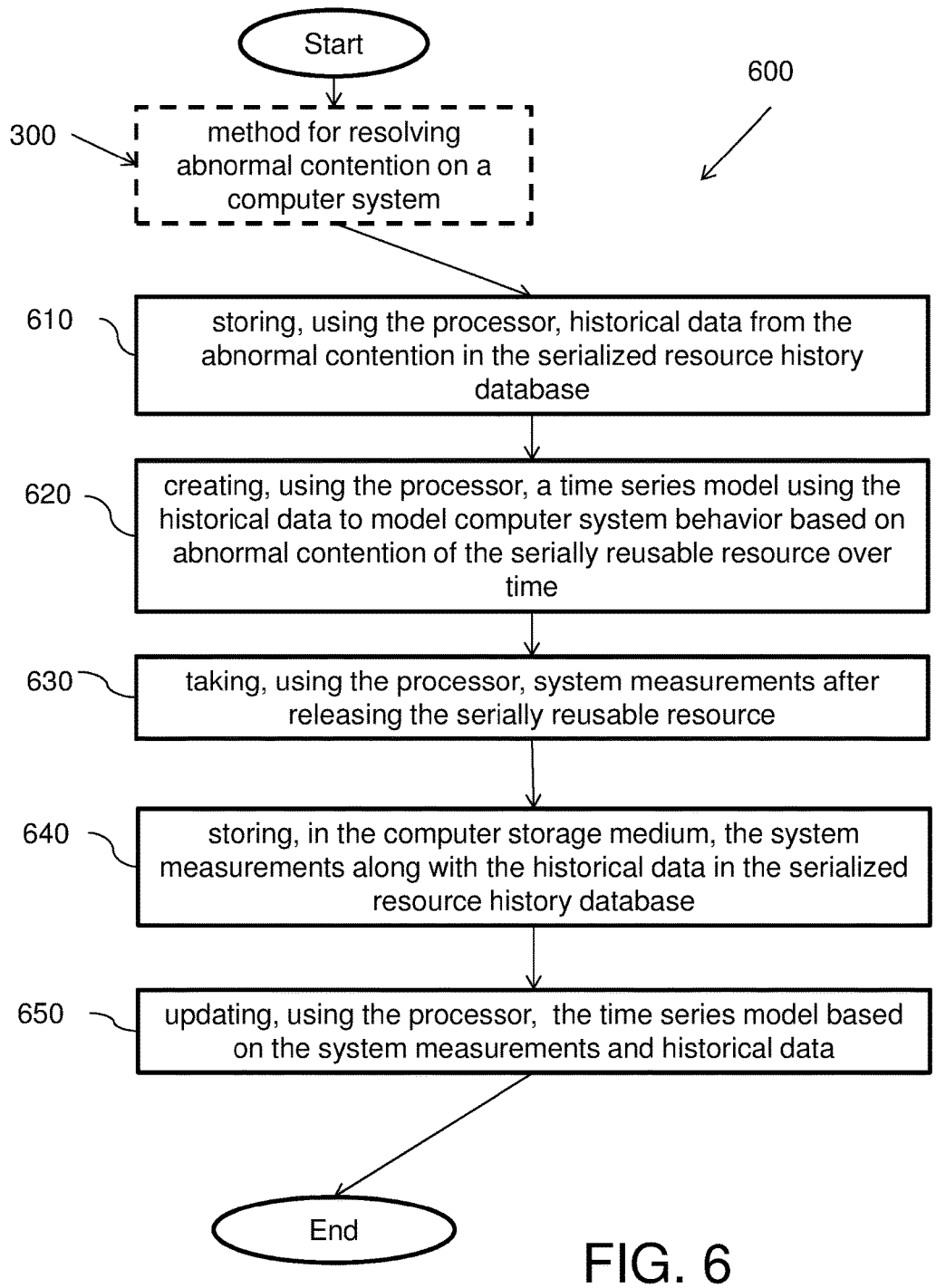
FIG. 6 depicts additional operations for the method for resolving abnormal contention as shown in FIG. 3 in accordance with some other embodiments of this disclosure.

FIG. 6 depicts a process flow of a method 600 that includes additional operations for the method 300 for resolving abnormal contention as shown in FIG. 3 in accordance with one or more embodiments of this disclosure. Specifically, the method 600 includes all the operations from method 300 as shown. The method 600 also includes additional operations 610-650. Particularly, the method 600 includes storing, using the processor, historical data from the abnormal contention in the serialized resource history database (operation 610). The method 600 also includes creating, using the processor, a time series model using the historical data to model computer system behavior based on abnormal contention of the serially reusable resource over time (operation 620). The times series model is updated periodically based on additional contention events. The method 600 further includes taking, using the processor, system measurements after making adjustments in response to abnormal contention of a serially reusable resource (operation 630). The method 600 further includes storing, in the computer storage medium, the system measurements along with the historical data in the serialized resource history database (operation 640). Finally, the method 600 includes updating, using the processor, the time series model based on the system measurements and historical data (operation 650).

According to one or more embodiments, other methods for a computer operating system to decide an action to take when processes using a serialized resource encounter abnormal contention are disclosed. Particularly, several actions are possible from waiting for the delay to clear, accelerating the holding process, terminating the holding process, or a combination thereof. According to another embodiment, actions can be taken on one or more processes holding a set of resources. According to another embodiment, a snapshot of the current state of all the serialized resources in the system and the processes holding or waiting for the resources can be taken and stored. Further, a contention health ratio can be calculated by calculating the ratio of the number of resources being held on the system versus the number of processes waiting for a held resource which were collected in the snapshot. Further, the contention health ratio can be adjusted by the relative priority of the processes of waiters and holders.

According to one or more embodiments, historical information for the processes and serialized resource can be collected and used to create a time series model of their behavior. The model can be updated periodically as additional historical information in created and stored. According to an embodiment, possible action choices can be modeled using the snapshot, and historical information, resource information, and action data, to simulate an effect of the possible action. The simulated possible action choice with the most positive change in process throughput and overall system utility can be chosen. Further, the least destructive option to the currently blocking process can be chosen if the simulations results are not significant. Additionally, in another embodiment, historical data can be kept on action choices, and the contention health ratio at intervals after the action is selected and processed. If a similar abnormal contention is found again, the historical data for that action can also be used to tailor the simulated action models, improving the algorithm used in the method and system to resolve abnormal contention.

According to one or more embodiments, processes can use a collection of serialized resources to change a serially reusable resource (write or exclusive mode) or to obtain data from a serially reusable resource without it being changed while reading the data (read or shared mode). With multiple processes accessing the same data and using the same serialized resources and serially reusable resource, multiple layers of contention can be expected to occur under certain processing conditions. When these contention scenarios, or events, become abnormal is when one of the disclosed methods and/or systems are used to resolve the abnormal contention. Some examples of abnormal contention events include, but are not limited to, deadlocks, which are also known as a deadly embrace. Another example is when the blocker, which can also be called a holder, is no longer active in the system, but failed to release the resource. Another example includes the holder spinning infinitely such that the holder is never able to release the resource. Another example is when the holder is not getting enough systems resources, such as CPU resources, to complete the work in a timely manner or the holder(s) are simply taking too long to release the resource for an unknown reason.

According to one or more embodiments, abnormal contention issues can be increasingly complex when serialized resources are not a single system in scope, and are instead a distributed environment across a cluster of systems. According to an embodiment, an available action includes waiting for a period of time before terminating (stopping) the process holding a resource. The time period to wait can vary. According to another embodiment, an available action includes immediately terminating the holding process. According to another embodiment, an available action includes accelerating the holding process. Acceleration can include giving the process a higher priority and access to more CPU or faster processing. In a cluster of systems and multi-system scope serialized resource, a virtual system could be given more resources in order to accelerate a holding process. According to another embodiment, an available action includes a combination of acceleration, waiting, and terminating the task if the wait expires.

Additionally, according to another embodiment, in a sequence of processes waiting and holding a set of resources, some processes may require action, while others may not if any one contention in that set is abnormal. Further, according to one or more embodiments, a system can be configured to determine an action to take on the processes that have the least negative impact while resolving the abnormal contention.

In one or more embodiments, a serialized resource history database can be established. The serialized resource history database contains information to be used for modeling and simulations for determining what action to take.

For example, according to an embodiment, the history database includes serialized resource event information. Serialized resource event information includes information collected when a process obtains a serialized resource. Particularly, serialized resource event information includes a record that can be created saving information about the process, and the serialized resource. Information such as the process name, process priority, serialized resource name, resource scope, and request type (read or write) can also be saved as serialized resource event information.

According to another embodiment, serialized resource event information contains information collected when a process releases a serialized resource. The serialized resource event information includes a record that can be created pointing to the record created when the resource was obtained. Information about the duration of the serialization, and whether any contention occurred can also be saved as serialized resource event information.

Further, in one or more embodiments, the history database includes contention event information. The contention event information can be collected when an attempted obtain of a serialized resource fails due to contention. In this event, a contention event record can be created. Additionally, information about the holding and waiting processes and serialized resource can be saved as contention event information.

According to another embodiment, resource information pertaining to how busy the system is and the amount of system resources the holding process is receiving can also be collected as contention event information. Further, according to another embodiment, the contention event record can be updated when the contention ends and the serialized resource is obtained. Information about the duration of the wait can also be saved in contention event information.

Further, in one or more embodiments, the history database includes serialized resource status counts collected on an interval. For example, counts of serialized resource requested (enqueues, latches, mutexes, etc.) since the last interval can be included in the serialized resource status counts. Request counts can be subdivided by whether the request is obtained or released and the type of obtain (read or write). According to another embodiment, serialized resource status counts can include a total count of serialized resources being held. According to another embodiment, serialized resource status counts can include a total count of serialized resources waiting for work. According to another embodiment, serialized resource status counts can include interval contention health ratio. The current state of the set of resources can be calculated by the ratio of the number of resources being held on the system, versus the number of processes waiting for a held resource, adjusted by the relative priority of the processes of the waiters and holders.

Further, in one or more embodiments, the history database includes abnormal contention event information. In one embodiment, the abnormal contention event information is collected when an abnormal contention event is detected, and includes a record of the event information and choice of action which is recorded. This can include the contention health ratio information at the time of the event, and expected ratio after the action. In another embodiment, the abnormal contention event information is collected while waiting and before stopping any processes to relieve the contention. If the contention does not clear automatically during the wait and a process is stopped, this can be recorded too as abnormal contention event information.

In one or more embodiments, a time series model of serialized resource and processes can be generated to help forecast future resource usage. According to an embodiment, the time series model can be created from a history database that can be periodically generated using algorithms such as cortical learning or hierarchical temporal memory. Additionally, according to another embodiment, a model of the effectiveness of actions against processes with resources in abnormal contention can be generated.

According to one or more embodiments, when an abnormal contention event is detected, a snapshot of the current set of serialized resources and their respective holding and waiting processes can be generated. From the snapshot a contention health ratio can be determined.

According to one or more embodiments, a set of possible actions can be generated to relieve abnormal contention. Each action can affect a process that is holding a serialized resource that was flagged as abnormal from a waiting process, or is holding a serialized resource that the holder of the flagged resource is waiting for. For example, when a Process A is waiting for a Resource 1 and a Process B is holding Resource 1, actions may occur on process B. Or when Process A is waiting for Resource 1 and Process B is holding Resource 1 but waiting for a Resource 2 that Process C holds, actions may occur on one of or both processes C or B.

According to another embodiment, when a first process holds a resource needed by a second process, and this first process is declared abnormal, action may be take on the first process, or action could be taken on a process further up the chain of resources. Further, one or more embodiments include weighing the respective contention health ratios of actions on the first 'holding' process and processes holding resources the first process is waiting for.

According to one or more embodiments, each selected action can be applied to a separate copy of the serialized resource snapshot. The future state of each resource and process can be obtained from the time-series model and played out on the snapshot copy. Further, the contention health ratio can be calculated for each manipulated snapshot, and compared to determine a course of action. For an action that includes continuing to wait for the holder process, the future state snapshot will be generated from the current snapshot and use time-series model to forecast into the future over the wait interval. This will help determine if it is likely if the holder will release the serialized resource before the interval expires.

According to another embodiment, for an action of accelerating the holder, a future state model can be generated like the model created for waiting. However, the interval into the future can be multiplied by an acceleration factor on an accelerated task to project further into the future.

According to another embodiment, for an action of stopping a process, a future state model can be generated by removing serialized resources of a stopped process from a current snapshot. Depending on the nature of the stopped process, a future state model can be generated determining what would happen when the stopped process is restarted.

In one embodiment, models can be generated with actions being taken on one serially usable resource. In another embodiment, models can be generated with actions taken on more than one serially usable resource.

In one or more embodiments, a change in contention health ratios can be compared for each solution in a set and actions and the most positive change can be chosen. Alternatively, in another embodiment, a least destructive option can be chosen if the simulations results are not significant.

Alternatively, in another embodiment, the destructiveness of each solution will be weighed with the change in contention health ratio to choose an action that has a most positive effect with the least negative effect.

According to one or more embodiments, after a choice is made and executed upon, an abnormal contention event can be recorded into the serialized resource history database. When future contention events match this contention event, the resulting health ratios at intervals after the previous action, can be used to determine the effectiveness of the action choice. According to another embodiment, for speed of look-up a model of the effectiveness of actions against processes with resources in abnormal contention can be periodically generated. The effectiveness of a particular action can be expressed as the ratio of expected vs actual improvement from the action. When new models are generated, the resulting contention health ratio deltas can be modified by data in the action effectiveness model. For example, according to one embodiment, if a previous contention instance did not clear after a longer wait period, a shorter wait period, will be attempted next time a similar contention is seen. The contention health ratio change score can then be adjusted by the action effectiveness model to improve the results of this algorithm.

Further, one or more embodiments account for a scenario where the first process holding a resource needed by the second process being labeled abnormal when a third process is actually causing the delay. For example, the first process can be waiting for another resource held by a third process, and taking action against the third process to help the first process complete and allow progress on the second process and other waiting processes. This could continue through a chain of waiting resources and processes. Thus, in these embodiments when abnormal contention is detected, action can be taken somewhere within any of the processes that are actually holding up the process which may not be on the holder process of the resource marked abnormally contentious.

For example, according to another embodiment, detecting abnormal contention of a serially reusable resource caused by a first process can further include detecting a third process related to the first process that the first process is dependent on for processing, wherein the third process is holding up the processing of the first process causing the abnormal contention by the first process of the serially reusable resource. Once this third process is detected and accounted for, when the method adjusts resource allocation for the first process, the method can further include adjusting resource allocation for the third process to allow the first process to continue processing. Adjusting the resource allocation of the third process can be done by using, for example, any of the disclosed embodiments described herein for the first process.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, Smalltalk, C++, or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:
1. A computer implemented method comprising:
   operations to resolve abnormal contention on a computer system, the operations comprising:

detecting, using a processor, the abnormal contention of a serially reusable resource caused by a first process, wherein the abnormal contention includes the first process blocking the serially reusable resource from a second process that is waiting to use the serially reusable resource;

in response to the detecting, using the processor, the abnormal contention of the serially reusable resource caused by the first process, collecting, in a computer storage medium, resource data in a serialized resource history database and analyzing the resource data associated with the serially reusable resource;

in response to the collecting the resource data and the analyzing the resource data associated with the serially reusable resource, adjusting, using the processor, resource allocation for the first process of the serially reusable resource based on the resource data;

in response to the adjusting resource allocation, processing, using the processor and the serially reusable resource, the first process based on the adjusted resource allocation; and in response to the processing, using the processor and the serially reusable resource, the first process, releasing, using the processor, the serially reusable resource by the first process in response to the first process completing, wherein adjusting resource allocation for the first process of the serially reusable resource based on the resource data comprises:

calculating a contention resolution health ratio between a resource count that includes serially reusable resources being held on the computer system and a process count that includes processes that request and wait for the serially reusable resources being held;

selecting a resource allocation scheme based on the contention resolution health ratio; and executing the resource allocation scheme, wherein the resource data comprises one or more from a group consisting of serialized resource event information, contention event information, serialized resource status counts, and abnormal contention event information.

* * * * *